United States Patent

[11] 3,634,002

| [72] | Inventor | Arthur E. Vollrath<br>Southfield, Mich. |
|---|---|---|
| [21] | Appl. No. | 55,175 |
| [22] | Filed | July 15, 1970 |
| [45] | Patented | Jan. 11, 1972 |
| [73] | Assignee | Electronic Enterprises, Inc.<br>Detroit, Mich. |

[54] REMOTE ELECTRICALLY CONTROLLED REARVIEW MIRROR
2 Claims, 5 Drawing Figs.

[52] U.S. Cl. ................................................. 350/289,
74/89.15, 74/89.17
[51] Int. Cl. ................................................. G02b 5/08
[50] Field of Search ........................................ 74/501 M,
89.15, 89.17; 350/289, 307, 303, 304

[56] References Cited
UNITED STATES PATENTS

| 3,537,778 | 11/1970 | Kurz, Jr. ............... | 350/289 |
| 3,492,065 | 1/1970 | Kurz, Jr. ............... | 350/289 |
| 3,429,639 | 2/1969 | Peters ................... | 350/289 |
| 3,005,384 | 10/1961 | Baird et al. ........... | 350/289 |

*Primary Examiner*—David Schonberg
*Assistant Examiner*—John W. Leonard
*Attorney*—Whittemore, Hulbert & Belknap ABSTRACT: The mirror assembly includes support structure for mounting on a vehicle. The support structure includes means for pivotally mounting a mirror thereon. Actuating mechanism driven by a reversible electric motor is provided for changing the angular adjustment of the mirror. The actuating mechanism is mounted within a sealed-tight housing which is interiorly compartmentalized to snugly receive the various components of the actuating mechanism without use of fasteners or brackets, the structure permitting direct dropping of the components into the housing. The motor is energized by means of a switch remotely located, normally within the cab of the truck or bus on which the mirror assembly is mounted.

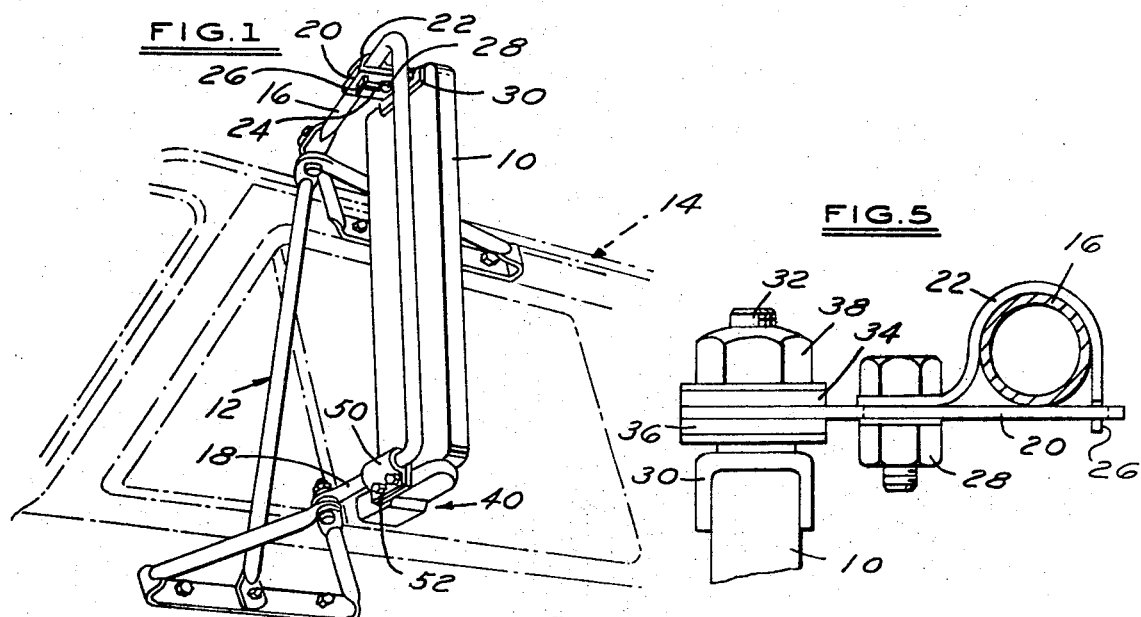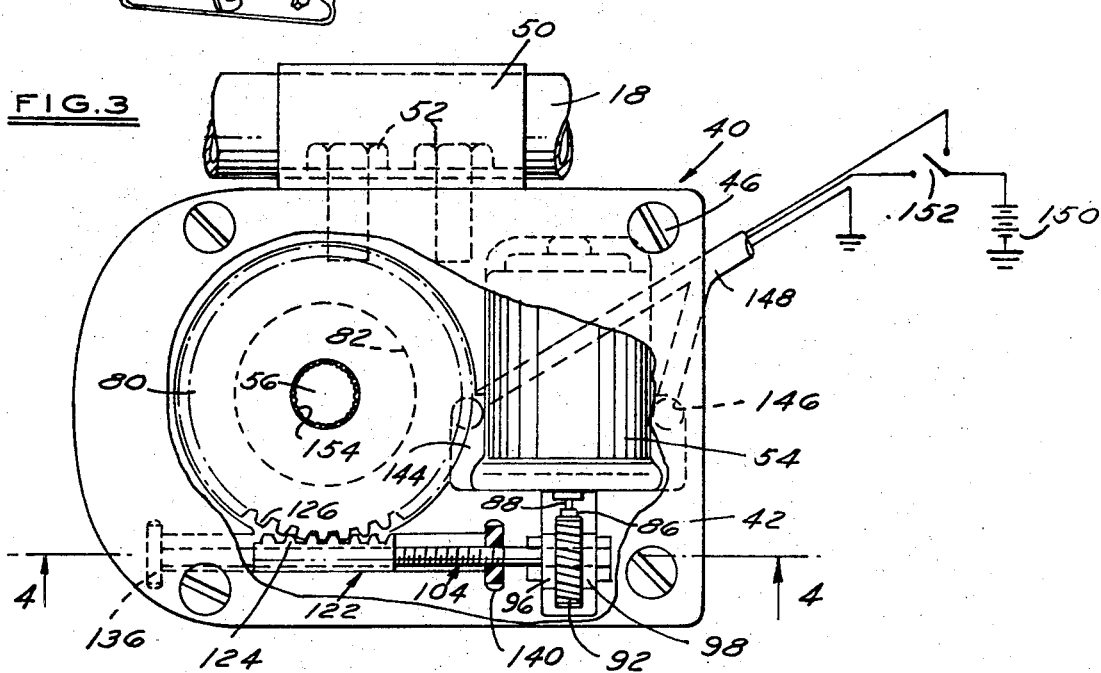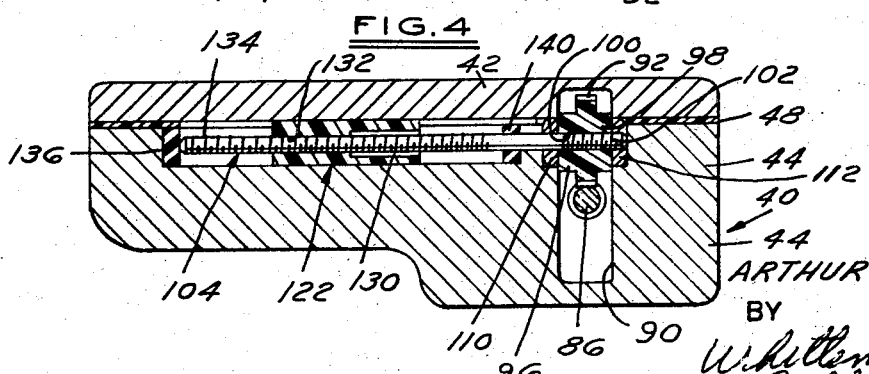

3,634,002

REMOTE ELECTRICALLY CONTROLLED REARVIEW MIRROR

BACKGROUND OF THE INVENTION

The type of mirror assembly to which the present invention relates are those commonly used on large vehicles, such as trucks, busses, and automobiles which pull trailers. Normally, one such mirror is provided on each side of the driver's compartment so that the driver will have a field of vision along both sides of the unit behind the driving component. The mirror is located a considerable distance outwardly from the sides. It is difficult for the driver to manually adjust the mirrors as needed. Consequently, a need has been expressed for remotely controlled adjusting means including switch means easily accessible to the driver for making adjustments to the mirrors while he is within the vehicle.

The present invention provides a mirror assembly which as a number of advantages. In the first place, the mirror assembly includes an actuating mechanism all of the components of which are mounted within a single housing. The components are not subjected to ambient weather conditions which could cause rusting, corrosion and dirt to collect and interfere with operation of the mechanism. The housing itself is interiorly compartmentalized permitting rapid and efficient assembly without use of fastening means, brackets and the like, the use of which causes high labor costs in assembling operations. Further, the compartments are so arranged and shaped as to match the contours of the components of the actuating mechanism so that during assembly, the components must be placed in the proper compartment where they will fit. This avoids misassembly of the unit.

SUMMARY OF THE INVENTION

The rear view mirror assembly is provided for mounting on the side of a vehicle. It comprises a support structure securable to a vehicle. Spaced apart mirror holding members are carried on the support structure. A mirror is mounted between the mirror holding members. Pivotal means pivotally connect the mirror at two spaced apart locations to the mirror holding members and thereby define a pivot axis for adjustment of the mirror with respect to a vehicle. One of the mirror holding members includes an actuating mechanism for powered mirror adjustment from a remote location. The actuating mechanism comprises a housing including separable portions. Fastening means sealingly connect the separable portions together. At least one of the portions has recessed compartments formed therein. A reversible electric motor and a gear train operably connected to the output thereof are received in the compartments. The compartments are shaped to match the shape of the motor and components of the gear train to permit assembly of the motor and components in proper operating positions. The output of the gear train is operatively connected to the pivotal means of said one mirror holding member to cause pivoting of the mirror upon energization of the motor. Remote switch means for energization of the motor completes the assembly.

IN THE DRAWINGS

FIG. 1 is a view in perspective of one embodiment of the remote electrically controlled two-way mirror of the present invention illustratively mounted on a vehicle;

FIG. 3 is a top plan view of the actuating mechanism with portions of the housing broken away for the purpose of clarity;

FIG. 4 is a sectional view taken substantially along the line 4—4 looking in the direction of the arrows; and FIG. 5 is a view of the upper bracket for mounting the mirror.

Figure 2:
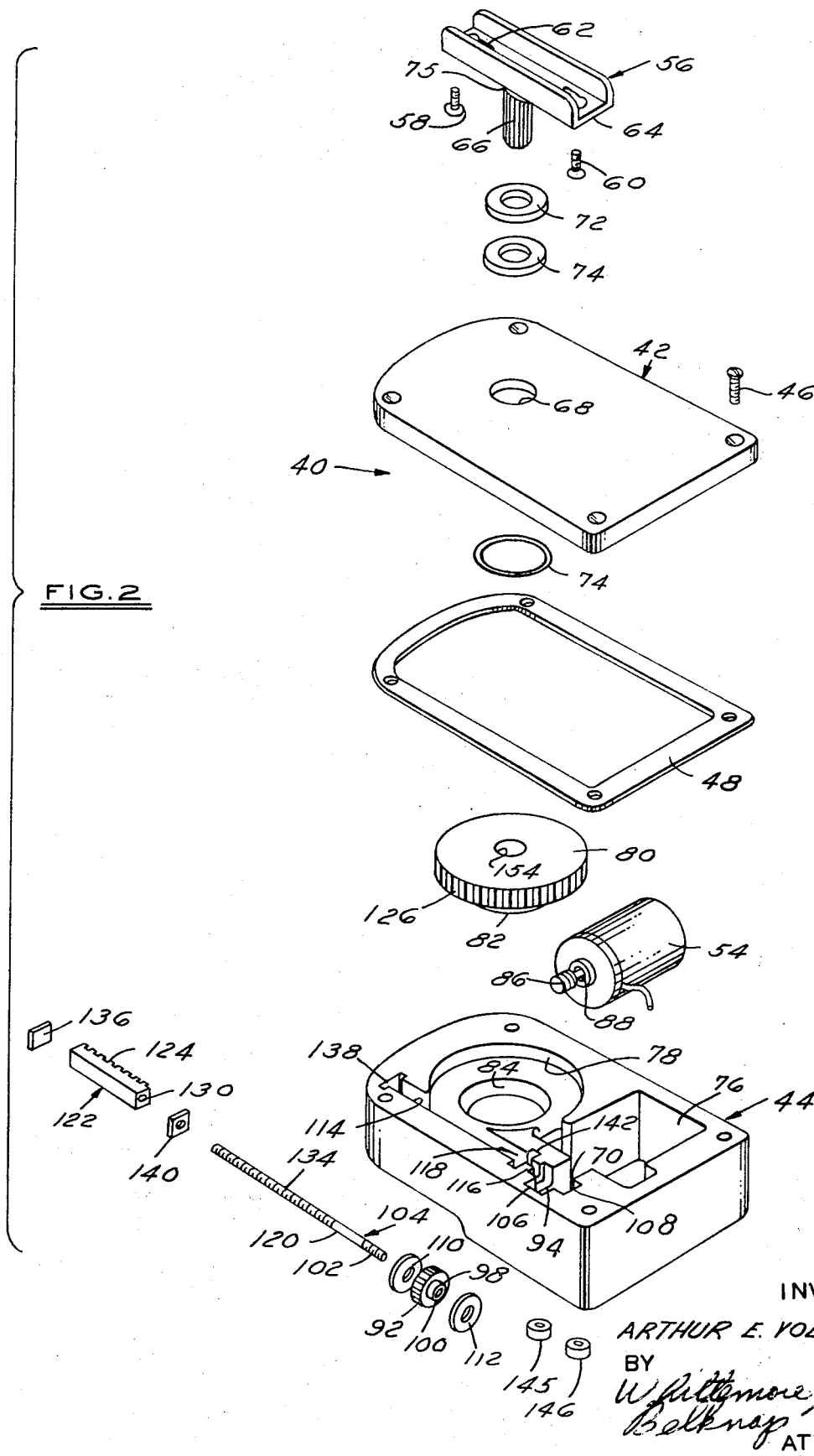
FIG. 2 is an exploded view in perspective of the actuating mechanism for adjusting the position of the mirror.

Referring to the drawings, the mirror 10 is of the type mounted on a large vehicle such as a bus or truck 14. The mirror 10 includes a frame and the usual reflecting glass. The mirror is generally rectangular in shape and is elongated in the vertical direction to present a large field of view. The mirror 10 is pivotally mounted on a support structure 12 which is attached to the side of the vehicle 14. The structure 12 includes tubular support members 16, 18 which extend outwardly from the vehicle to position the mirror 10 the desired distance away from the vehicle as is conventional.

The upper end of the mirror 10 is pivotally mounted to the tubular support member 16 by means of a bracket structure which includes a generally horizontally extending plate 20 which extends beneath the support member 16 and a loop strap portion 22 which extends around the member 16. An elongated slot 24 is provided in the plate 20 to receive the notched end 26 of the strap 22 and a nut and bolt structure 28. The slot 24 permits a degree of horizontal adjustment of the plate 20 with respect to the support member 16 to properly position the mirror 10.

A U-shaped member 30 receives and holds the upper end of the mirror 10. A threaded stud 32 extends upwardly from the member 30 through an opening in the plate 20. Washer members 34, 36 are provided on the stud 32 above and below the plate 20. A nut 38 is threadingly received on the upper end of the stud 32. The nut 38 applies sufficient pressure to the washers to firmly hold the assembly together but at the same time permit pivoting of the upper end of the mirror.

The lower end of the mirror 10 is supported by actuating mechanism 40. The actuating mechanism 40 includes a housing comprising separable upper and lower members 42, 44 which are secured together by means of screws 46. A gasket 48 is provided between the members 42, 44 to seal the interior of the housing from ambient atmosphere. A strap-type bracket 50 engages the lower tubular support member 18 and is secured to the lower housing member by means of screws 52.

Power mechanism is provided within the housing to cause desired pivoting of the mirror 10 about a vertical axis. The power mechanism includes a reversible electric motor 54 and suitable gearing therefrom for pivoting of a U-shaped bracket 56. The lower marginal edge of the mirror 10 is received in the bracket 56 and held in place by means of screws 58, 60 which extend through elongated openings 62, 64 in the bracket which permit lateral adjustment of the lower marginal edge of the mirror 10. A shaft 66 extends from the bracket 56 through an opening 68 in the upper housing member 42. The shaft 66 is serrated longitudinally on the exterior surface. A pair of plastic washers 70, 72 are provided between the bracket 50 and housing upper portion 42 to space the bracket from the housing to permit smooth pivoting action. An O-ring 74 is received on the shaft 66 within the opening 68 to seal the opening against ingress of moisture and dirt. The O-ring 74 is received on nonserrated shaft portion 75.

The housing lower portion 44 is relatively thick and is provided with recesses shaped to match and receive the motor and gearing. These pieces may be easily dropped into their respective openings upon assembly to thereby reduce the assembly cost and to minimize possible error in assembly because the parts must be dropped into the proper recesses otherwise they will not fit. A relatively large recess 76 is provided to receive the motor 54. A large cylindrical recess 78 is provided adjacent thereto to receive a circular gear 80. The gear 80 has a cylindrical projection 82 on the underside thereof which is received in a smaller cylindrical recess 84 to thereby pivotally mount the gear 80.

The motor 54 has a worm 86 on the output shaft 88. The shaft and worm are received in a recess 90. The worm 86 projects beneath a worm gear 92 which is received in recess 94. The gear 92 has a hub 96, 98 on each side thereof. A central threaded opening 100 is formed in the gear 92 to threadingly receive threaded end 102 of a metallic shaft 104 and thereby lock the shaft to the gear for rotation therewith. Small recesses 106, 108 are provided laterally of the recess 94 to receive washers 110, 112. The shaft 104 extends through the washers and abuts against the side surface of the recess 108. An elongated recess 114 is provided adjacent to the recess 94. A wall 116 separates these recesses. A notch 118 is provided in the wall 116 to receive unthreaded portion 120 of the shaft 104.

A gear rack 122 is received in the recess 114. The recess 114 merges with the recess 78 to thereby permit engagement of the rack teeth 124 with the teeth 126 of the gear 80. An axially extending opening is provided in the rack 122. The first portion 130 of the opening is unthreaded while the second portion 132 is internally threaded to threadingly receive threaded portion 134 of the shaft 104. A rubber spacer 136 is provided in recess 138 at the end of rack travel. A similar spacer 140 having a central opening therein for passage of the shaft 104 is provided in recess 142 at the other end of the rack.

The various components thus described should be fabricated of corrosion resistant material with proper strength characteristics and some of which have low coefficients of friction to thereby avoid the necessity of oiling the device during use. Exemplarily, the gears 80, 92 and rack 122 may be fabricated of a plastic such as nylon while the worm may be fabricated of brass with the shaft 104 being fabricated of copper. Other similar materials may be used as desired to accomplish satisfactory results.

Referring to FIG. 3, it will be noted that a pair of openings 144, 146 are provided in the bottom of the lower housing portion 44 for passage of branches of electrical cable 148. Grommets 145, 147 (FIG. 2) are provided to seal openings 144, 146. The electrical cable is representatively connected to a source of electrical power, representatively a vehicle battery 150, by means of a double throw switch 152 to permit actuation of the motor 54 in either direction for adjustment of the mirror 10.

The assembled condition of the actuating mechanism 40 may best be appreciated in FIGS. 3 and 4. It will be noted that the housing idler portion 42 has recesses to receive upwardly projecting portions of the drive mechanism. As previously mentioned, the worm 86 is positioned beneath the worm gear 92 and in mesh therewith to cause rotation of the worm gear 92 in either direction upon energization of the motor 54. The shaft 104, which is fixed for rotation to the worm gear 92, extends entirely through the rack 122 as shown in FIGS. 3 and 4. Rotation of the shaft 104 in either direction will cause longitudinal movement of the rack 122. The extent of longitudinal movement is the space between the spacers 136, 140. The rack 122, which meshes with the gear 80, is capable of pivoting the gear 80 through an angle equal to an arc on the gear having a length equal to the distance which the rack may travel, which in the present instance is about two-thirds of the length of the rack recess 144.

The serrated shaft 66 of the bracket 56 extends through central openings 154 in the gear 80 with a press fit and is thus attached to the gear for rotation therewith. The shaft 66 will be pivoted the same angular distance as the gear 80 upon manipulation of the rack 122. The shaft 66, via the bracket 56, is thus capable of pivoting the mirror 10 through this angle. The position shown in FIGS. 1, 3 and 4 is substantially the center position of the mirror 10. The mirror 10 may be pivoted clockwise or counterclockwise through areas sufficient to permit the necessary adjustment of the field of vision thereof to suit the requirements of variously sized drivers and various driving conditions. The driver need only manipulate the switch 152 in one direction or the other to cause rotation of the mirror automatically from inside his driving position within the vehicle cab.

What I claim as my invention is:

1. A rear view mirror assembly for mounting on the side of a vehicle comprising a support structure securable to a vehicle, spaced apart mirror holding members carried on said support structure, a mirror, pivotal means pivotally connecting said mirror at two spaced apart locations to the mirror holding members, said pivotal means defining a pivot axis for adjustment of the mirror with respect to a vehicle, one of said mirror holding members including an actuating mechanism for powered mirror adjustment from a remote location, said actuating mechanism comprising a housing including separable portions, means securing said separable portions together in sealed condition, at least one of said portions having recessed compartments formed therein, a reversible electric motor and gear train operably connected to the output thereof received in said compartments, said compartments being shaped to match the shape of said motor and components of said gear train permitting assembly of said components in said one housing portion by lowering the components therein in proper operating position, the output of said gear train including a rack and gear assembly, said one portion including side-by-side compartments receiving said gear and said motor and an elongated compartment extending between peripheral portions of said compartments receiving said rack, said housing being provided with shaft opening means in alignment with the axis of said gear, shaft means extending through said opening means from said one mirror holding member and defining pivotal means associated therewith, said shaft means extending into connection with said gear for rotation therewith, sealing means sealing said shaft opening means around said shaft means, said housing having additional opening means for extension of electrical cable means from the motor exteriorly of the housing, means sealing said additional opening means, said shaft opening means and said additional opening means for the electrical cable means forming the only opening means into the housing, and remote switch means for energization of the motor.

2. An assembly as defined in claim 1, further characterized in that the compartment for retaining the gear includes a central cylindrical recess in the bottom thereof of reduced diameter with respect to the main compartment portion, said gear having a cylindrical projection received in said cylindrical recess, said cylindrical projection and central cylindrical recess defining means journaling the gear within the housing.

* * * * *